United States Patent [19]

Ueda

[11] Patent Number: 4,529,322
[45] Date of Patent: Jul. 16, 1985

[54] BOOSTER CIRCUIT FOR ELECTRONIC WATCH ELEMENTS

[75] Inventor: Makoto Ueda, Tokyo, Japan

[73] Assignee: Seiko Instruments & Electronics Ltd., Tokyo, Japan

[21] Appl. No.: 386,639

[22] Filed: Jun. 9, 1982

[30] Foreign Application Priority Data

Jun. 22, 1981 [JP] Japan .................. 56-96136

[51] Int. Cl.³ .............................. G04C 21/16
[52] U.S. Cl. .................... 368/255; 368/64; 368/204; 318/116
[58] Field of Search ............. 368/255; 310/314–320, 310/321, 322

[56] References Cited

U.S. PATENT DOCUMENTS 3,872,330  3/1975  Miller et al. .................. 310/316
3,989,963  11/1976 Giaccardi ..................... 310/322
4,232,241  11/1980 Hamatani ..................... 310/317
4,362,399  12/1982 Fick ........................... 368/255

FOREIGN PATENT DOCUMENTS 56-79987  6/1981  Japan ......................... 368/255

Primary Examiner—Bernard Roskoski
Attorney, Agent, or Firm—Robert E. Burns; Emmanuel J. Lobato; Bruce L. Adams

[57] ABSTRACT

A booster circuit in an electronic watch having: hands for indicating time or a display portion such as a panel for displaying time digitally; a lamp for lighting the display portion by electroluminescence (EL element); and a sound generating portion for generating sound at an alarm setting time by vibration of a piezo-electric element. The booster circuit has a boosting member for driving the EL element and a boosting member for driving the piezo-electric element. These boosting members commonly use one coil.

14 Claims, 10 Drawing Figures

BOOSTER CIRCUIT FOR ELECTRONIC WATCH ELEMENTS

BACKGROUND OF THE INVENTION

The present invention relates to a booster circuit for use in an electronic watch having an electroluminescent element (referred to as an EL element hereafter) and a piezo-electric alarm device using a piezo-electric element.

Conventionally, a circuit shown in FIG. 1(A) is used as a booster circuit for a piezo-electric alarm device. A boosting coil 2 is connected in series with a transistor 3 and connected in parallel with a piezo-electric element 1.

When a signal having a waveform 'a' shown in FIG. 1(B) is fed to a base of the transistor 3, a voltage having a waveform 'b' shown in FIG. 1(B) develops at a connection point 'b' of the boosting coil 2 and the transistor 3. A peak voltage of the voltage waveform 'b' of approximately 10 V is sufficient to generate an alarm sound when applied to the piezo-electric element.

FIG. 2(A) shows a conventional EL element driver. A boosting coil 6 is connected in series with a transistor 9, and one terminal of a diode 10 is connected with a connecting point of the boosting coil 6 and the transistor 9 and the other terminal of the diode 10 is connected with a connecting point 'e' of an EL element 5 and a transistor 8. A resistor 7 is connected as shown for limiting currents.

The boosting principle will now be illustrated. When a waveform 'c' in FIG. 2(B) is fed to a base of the transistor 9, a pulse counter electromotive voltage develops across the boosting coil 6 at the fall timing of each pulse. The counter electromotive voltage is charged in the EL element 5 having the equivalent electric capacity via the diode 10. The terminal 'e' rapidly boosts by repeating the above operation several times (three times in the figure), and the voltage of approximately 100 V is obtained. The transistor 8 is then turned on by applying a signal 'd' to a base of the same, and the EL element is luminesced by discharging the accumulated electric charges.

The conventional EL element driver is disadvantageous in that it is necessary to mount two boosting coils of large volume for boosting both an EL element and a piezo-electric element on an electronic watch. As a result the overall watch size is increased and the cost of the watch is increased.

SUMMARY OF THE INVENTION

Accordingly, the present invention aims to eliminate the above noted drawbacks, and therefore, it is an object of the present invention to provide one boosting coil for boosting both the EL element and the piezo-electric element.

DETAILED DESCRIPTION OF THE PREFERRED EMBODIMENTS

Figure 3:
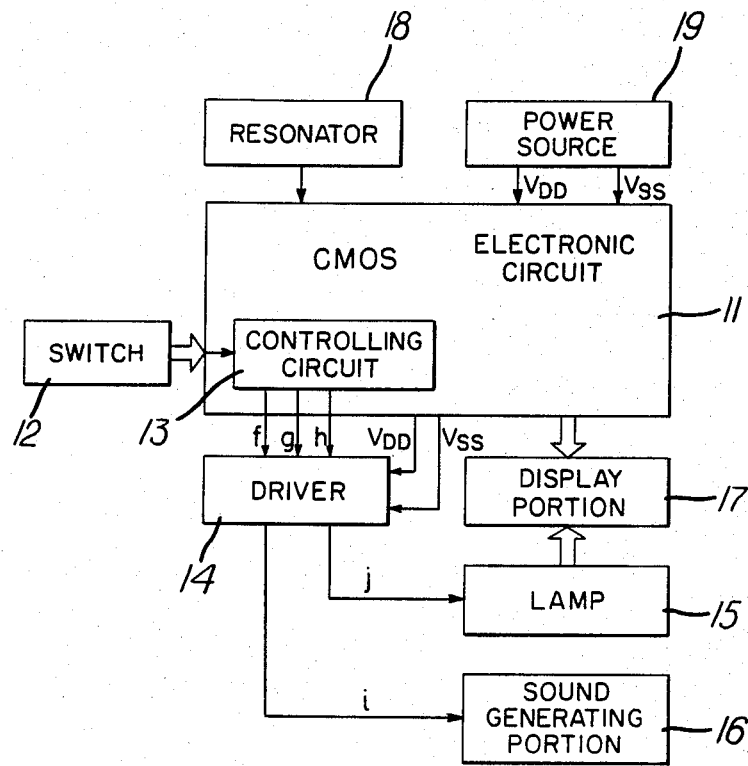
FIG. 3 shows a block diagram of an electronic watch according to the present invention.

FIG. 3 shows a block diagram of an electronic timepiece according to the present invention. A resonator 18 comprises a quartz crystal. A power source 19 is a silver battery of $V_{DD}-V_{SS}=1.57$ V and a CMOS electronic circuit 11 comprises made up of an oscillator, a frequency-divider, a counter, a driver 14 for driving a display portion 17, and a controlling circuit 13 for controlling a lamp 15 and a sound generating portion 16. A switch 12 is provided on a watch casing to feed a switching signal to the controlling circuit 13 for controlling the lamp and the sound generating portion when a demonstration sound is fed.

Three signal lines 'f', 'g' and 'h' are fed from the controlling circuit 13 to the driver 14. A signal line 'j' from the driver 14 is connected with the lamp 15. When a signal is fed to the lamp 15, an EL element 26 luminesces to light the display portion 17. The display portion 17 lights a dial and hands of an analogue electronic watch, while an EL element disposed under a liquid crystal display in an digital electronic watch is luminesced by turning the EL element on. By such a construction, a user can easily tell the time even in the dark. An output signal 'i' from the driver 14 is fed to a piezo-electric element 25 of the sound generating portion 16 to generate an alarm sound.

The driver 14 which is a feature of the present invention will now be illustrated in detail with reference to FIG. 4. The driver 14 is made up of one boosting coil, three bipolar transistors and two diodes. A boosting coil 24 is connected in series with a transistor 27 between $V_{DD}$ and $V_{SS}$. A diode 22 and a transistor 20 are connected in series with a connecting point of the boosting coil 24 and the transistor 27, and the connecting point of the diode 22 and the transistor 20 is an output terminal 'i' of the sound generating portion 16. One terminal of a diode 23 is connected with the connecting point of the boosting coil 24 and the transistor 27 and the other terminal of the diode 23 is connected with a transistor 21, and the connection terminal 'j' serves as an output terminal to the EL element 26.

Figure 5:
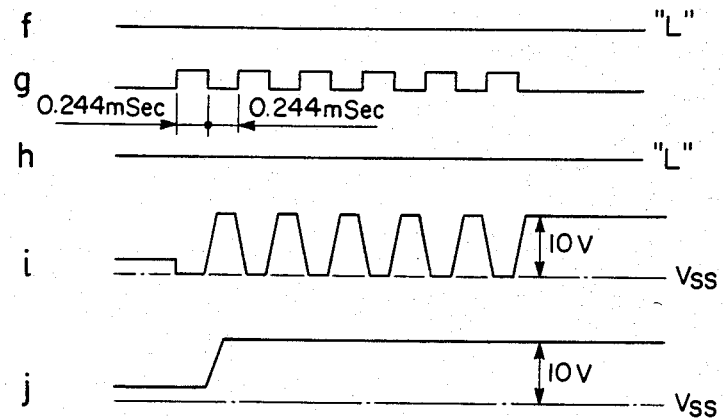
FIG. 5 shows a waveform chart in the case a piezo-electric element is driven.
Figure 6:
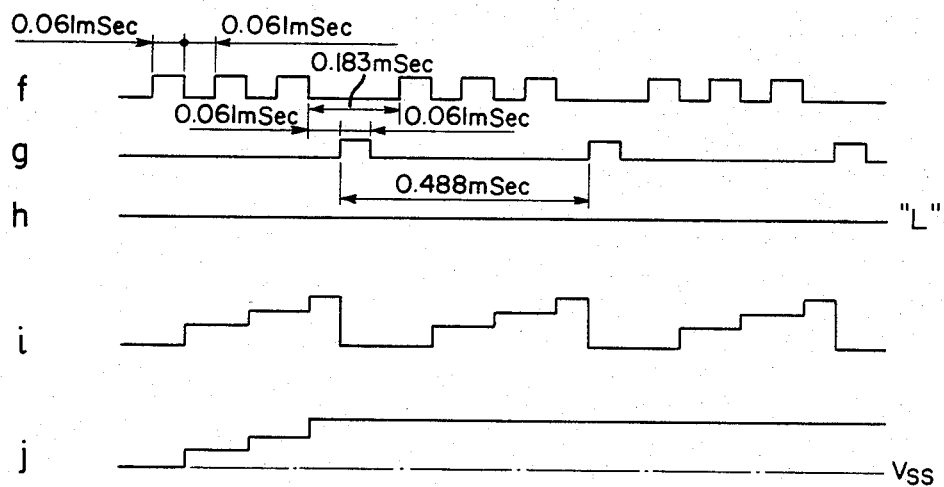
FIG. 6 shows another waveform chart in the case a piezo-electric element is driven.

The relation between the signals applied to the signal lines 'f', 'g', 'h' and the driving signals applied to the terminals 'i', 'j' will be illustrated in conjunction with FIGS. 5 and 6. For ease of illustration, the same reference character denotes both the signal waveform and the signal line or terminal where the signal appears.

FIG. 5 shows a waveform chart of the signals in the case of alarm operating condition in which the piezo-electric element 25 vibrates. The signals 'f' and 'g' are at "L" level, and an alarm signal of 2048 Hz or 4096 Hz divided by the frequency divider is generally applied to the signal line 'g'. The 'i' signal shown in FIG. 5 having a peak value of approximately 10 V is produced at the terminal 'i' of the sound generating portion 16 to generate an alarm sound.

The boosting principle will be illustrated next. When the transistor 20 is turned on, a current flows through the boosting coil 24, diode 22, transistor 20 to make the terminal 'i' at $V_{ss}$ level. When the transistor 20 is turned off, a counter electromotive voltage develops across the boosting coil 24 and a peak voltage of approximately 10 V is produced. The 10 V peak voltage is charged in the piezo-electric element 25 having an equivalent electric capacity via the diode 22. The piezo-electric element 25 discharges when the transistor 20 is turned on, and it charges when the transistor 20 is turned off. The above charging and discharging cycle is repeated to vibrate the piezo-electric element 25. The EL element 26 is charged by turning off the transistor 22 when the voltage at the terminal 'j' is lower than the voltage at the terminal 'i', and the ON-OFF operation of the transistor 20 does not affect the elements after the terminal 'j' is charged up to the peak voltage of the terminal 'i'. Since the voltage at the terminals is approximately 10 V and the charging and discharging cycle is not repeated, the EL element 26 is not luminesced.

FIG. 6 shows another waveform chart of the signals in the case of the alarm operating condition in which the piezo-electric element 25 vibrates. By the driving method in FIG. 6, a larger sound voltage than that of FIG. 5 is obtained.

The driving principle in case of the fundamental driving frequency at 2048 Hz will be illustrated. The signal 'g' is at "L" level and the transistor 21 is turned off. The signal 'f' is an 8192 Hz signal having a duty cycle of ½, in which the ratio of the "H" level to "L" level is 3:1. The signal 'g' is at "H" level when the signal 'f' is at "L" level.

Figure 4:
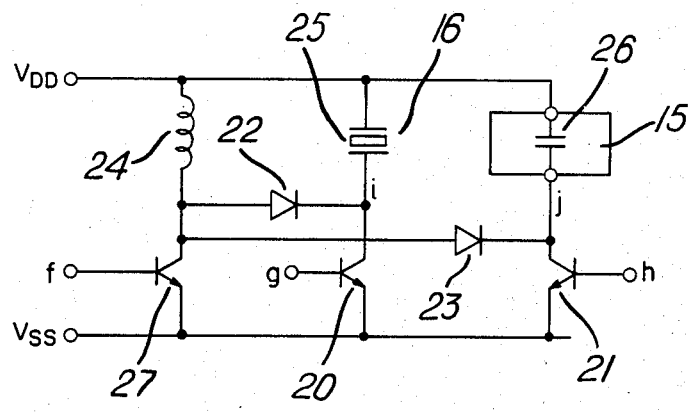
FIG. 4 shows a driver, lamp and sound generating circuit portion according to the present invention.

When the 'f' signal is fed to the base of the transistor 27 in FIG. 4, the transistor 27 is turned off and a high voltage having a peak value of approximately 10 V is developed across the boosting coil 24 by the counter electromotive voltage. The peak voltage value is memorized in the piezo-electric element 25 and the EL element 26 having the equivalent electric capacity via the diodes 22 and 23. When the transistor 27 is turned on and then turned off, the same peak voltage develops across the boosting coil 24. Since this voltage is added to the voltage previously memorized, the voltage value rises up to about 20 V. The terminals 'i' and 'j' boost up to around 30 V by in response to a third switching operation. When the transistor 20 is turned on at the next "H" level state of the signal 'g', the electric charges accumulated in the piezo-electric element 25 rapidly discharge to vibrate the piezo-electric element. On the other hand, the electric charges are accumulated in the EL element and the electric potential is held since the transistor 21 is turned off, whereby the EL element is not luminesced.

Figure 7:
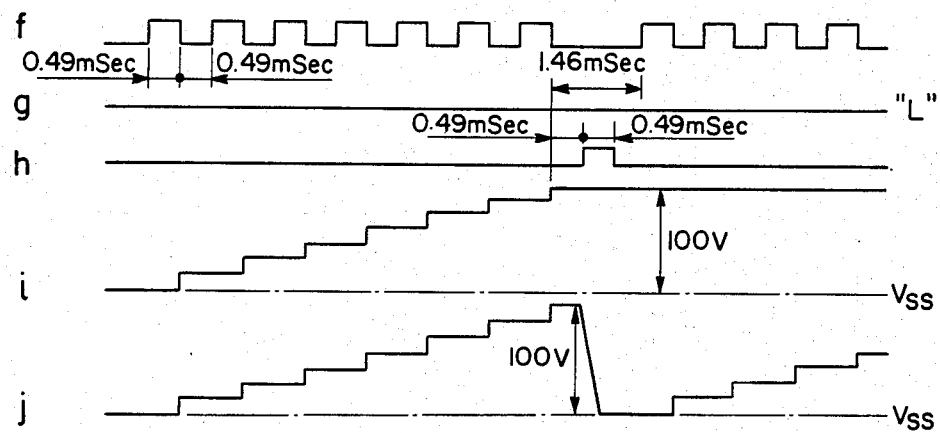
FIG. 7 shows a waveform chart in the case an EL element is driven.

FIG. 7 shows a waveform chart of the signals in the case of the lighting operation in which the EL element 26 luminesces. The signal 'g' is at "L" level and the transistor 20 is turned off. The signal 'f' is a 1024 Hz signal having a duty cycle of ½, in which the "H" level is produced for one complete boosting cycle 7 times. The signal 'h' is at "H" level when the signal 'f' is at "L" level.

When the signal 'f' is fed to the transistor 27, the counter electromotive voltage develops across the boosting coil 24 at the fall timing of the signal 'f'. As a result the piezo-electric element 25 and the EL element 26 having the equivalent electric capacity are charged via the diodes 22 and 23.

By repeating the above operation several times (seven times in this embodiment), the voltages at the terminals 'i' and 'j' rapidly go up and reach approximately at 100 V. When the transistor 21 is turned on by the signal 'h', the voltage charged in the EL element 26 is discharged and the EL element is luminesced. The voltage charged at the terminal 'i', however, is held since the transistor 20 is kept in an "OFF" state, and the terminal 'i' does not affect the succeeding charges of the EL element.

As illustrated so far, since the sound generating portion and the lamp can be driven by one boosting coil without affecting the operation of the non-driven one, the space required for a second coil is eliminated. Further, since the elements serving as the driver, such as the diode and the transistor, are of small size except for the boosting coil, the assembly of the elements is easy. The elements are easily integrated as a driver on one chip as a bipolar IC. Further, one of the electric potentials of the EL element and the piezo-electric element are both $V_{DD}$, which is the same electric potential as the watch case, whereby the elements are easily mounted.

Figure 8:
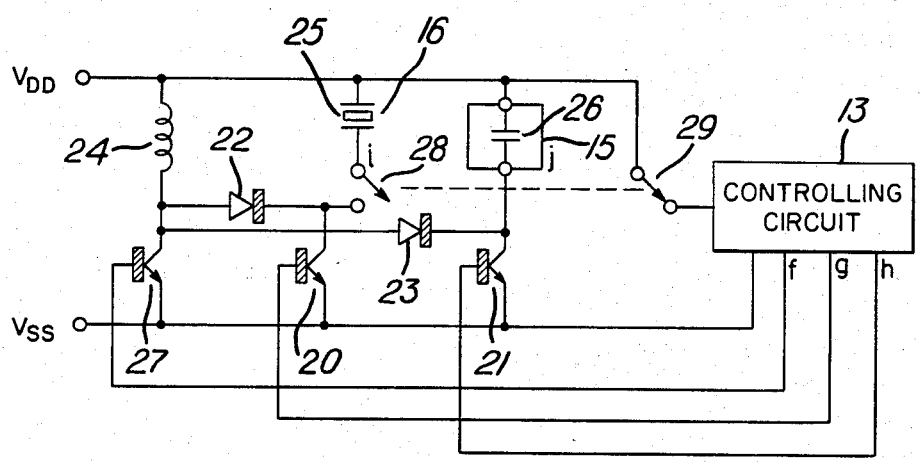
FIG. 8 shows a modified form of the circuitry of FIG. 4 which includes a set of interlocking switches.

FIG. 8 shows a circuit in which interlocking switches 28 and 29 for luminescing the EL element 26 are added to the circuit shown in FIG. 4. The switch 28 is OFF and the switch 29 is ON only when the EL element 26 is luminescing, while the switch 28 is ON and the switch 29 is OFF when the EL element 26 is not luminescing and the piezo-electric element is driven.

The addition of the switches 28 and 29 results in the following advantages. In case the boosting coil 24 is driven by closing the switch 29 when the EL element 26 is luminescing, the electric charges are not accumulated in the piezo-electric element 25 since the switch 28 is OFF. Since the transistor 20 is also OFF, there is no current through the diode 22. Thus, as all the electric energy obtained by the boosting coil 24 can be accumulated in the EL element, the efficiency of luminescence, particularly at the rise timing of the signals, is improved over that of the circuit shown in FIG. 4. In the circuit in FIG. 4, a high voltage continues to accumulate in the piezo-electric element 25 while the EL element 26 is luminescing, thereby the piezo-electric element 25 is subjected to unusually large distortions and is easily destroyed. On the contrary, there is no such problem in the circuit of FIG. 8 since the electric charges are not accumulated in the piezo-electric element.

When the EL element 26 is not luminescing, the switch 28 is ON and the switch 29 is OFF; this is the normal state. In this condition, if the drive signals 'f' and 'g' for the piezo-electric element 25 are applied from the controlling circuit 13, a voltage equivalent to the drive voltage of the piezo-electric element 25 is kept accumulating at the 'j' terminal of the EL element 26. This voltage, however, is too small to be effective as the voltage applied to the drive EL element 26 and thus has no affect on the EL element. Further, since the electrostatic capacitance of the EL element 26 is sufficiently smaller than that of the piezo-electric element, the electric charges flown into it are small and scarcely affect on the sound voltage of the EL element 26.

Thus, the EL element can be driven by adding a small number of elements to the conventional alarm electronic watch without increasing the volume and cost.

Figure 1A:
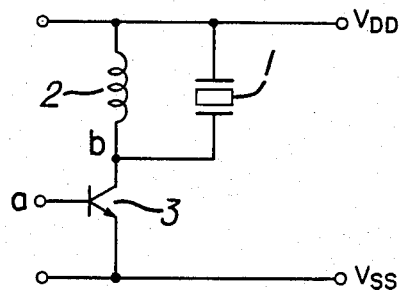
FIG. 1(A) shows a driving circuit for a conventional piezo-electric element and FIG. 1(B) shows a waveform chart therefor.
Figure 2A:
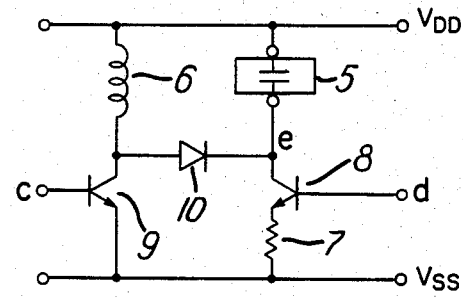
FIG. 2(A) shows a driving circuit for a conventional EL element driver and FIG. 2(B) shows a waveform chart therefor.
Figure 1B:
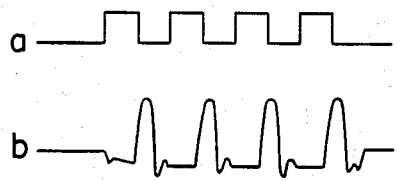
Figure 2B:
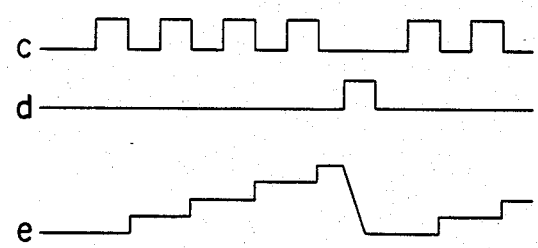

The circuit in FIG. 4 comprises the minimum elements which make up the booster circuit according to the present invention. It is to be noted that the elements, such as the resistor 7 shown in FIG. 2(A) or a diode for preventing the voltage from developing when the piezo-electric element is shocked, can be added when assembled in a watch, without changing or departing from the principles of the present invention.

What I claim is:

1. A booster circuit for electronic watch elements comprising: a lamp having an electroluminescent element driven by a relatively high voltage for lighting a display portion of the watch for indicating time; a sound generating portion having a piezo-electric element driven by a relatively low voltage for generating sound at an alarm setting time by vibration of the piezo-electric element; and booster circuitry for independently boosting the voltage applied to both the electroluminescent element and the piezo-electric element to obtain the relatively high and low voltages comprising a first power source line, a second power source line, first circuit means having a boosting coil connected to a first switching element at a first connection point, second circuit means having said piezo-electric element connected to a second switching element at a second connection point, third circuit means having said electroluminescent element connected to a third switching element at a third connection point, said first circuit means, second circuit means and third circuit means being connected in parallel with one another between said first power source line and said second power source line, a first diode connected between said first connection point and said second connection point, and a second diode connected between said first connection point and said third connection point.

2. A booster circuit for electronic watch elements according to claim 1; including a closed loop comprising said boosting coil, said first diode and said piezo-electric element; and means for selectively opening the closed loop.

3. In an electronic device having an electroluminescent element operable when driven by a relatively high voltage to emit light and a piezo-electric element operable when driven by a relatively low voltage to produce sound: driving means for applying drive signals to the electroluminescent and piezo-electric elements to drive the same independently of each other and for boosting the voltage of the drive signals, the driving means comprising first and second power source lines which are maintained at different voltage levels during use of the electronic device, a first circuit comprised of a boosting coil connected to a first switching means at a first connection point, a second circuit comprised of said piezo-electric element connected to a second switching means at a second connection point, a third circuit comprised of said electroluminescent element connected to a third switching means at a third connection point, the first, second and third circuits being connected in parallel with one another between said first and second power source lines, a first diode connected between said first and second connection points, and a second diode connected between said first and third connection points.

4. An electronic device according to claim 3; wherein the driving means includes a closed loop comprised of a series connection of the boosting coil, the first diode and the piezo-electric element; and means for selectively opening the closed loop.

5. An electronic device according to claim 4; wherein the means for selectively opening the closed loop comprises means for disconnecting the piezo-electric element from the first diode.

6. An electronic device according to claim 3; wherein the driving means includes means for selectively disconnecting the piezo-electric element from the first diode.

7. An electronic device according to claim 6; wherein the means for selectively disconnecting the piezo-electric element from the first diode comprises means for disconnecting the piezo-electric element from the first diode whenever the boosting coil is being used to boost the drive signal voltage of the electroluminescent element.

8. An electronic device according to claim 6; wherein the first, second and third switching means comprise switching transistors whose emitter-collector paths are connected to one of the first and second power source lines.

9. An electronic device according to claim 3; wherein the electronic device comprises a timekeeping device having a liquid crystal display portion for displaying time and being connected so as to be illuminated by light emitted from the electroluminescent element and having a second generating portion for generating sound at a preset alarm time and being connected so as to use the piezo-electric element as the sound source.

10. An electronic device according to claim 9; wherein the driving means includes a closed loop comprised of a series connection of the boosting coil, the first diode and the piezo-electric element; and means for selectively opening the closed loop.

11. An electronic device according to claim 10; wherein the means for selectively opening the closed loop comprises means for disconnecting the piezo-electric element from the first diode.

12. An electronic device according to claim 9; wherein the driving means includes means for selectively disconnecting the piezo-electric element from the first diode.

13. An electronic device according to claim 12; wherein the means for selectively disconnecting the piezo-electric element from the first diode comprises means for disconnecting the piezo-electric element from the first diode whenever the boosting coil is being used to boost the drive signal voltage of the electroluminescent element.

14. An electronic device according to claim 12; wherein the first, second and third switching means comprise switching transistors whose emitter-collector paths are connected to one of the first and second power source lines.

* * * * *